Aug. 16, 1966 — C. V. STROMBERG — 3,266,271
VIBRATION DAMPENER ASSEMBLY
Filed June 8, 1964 — 3 Sheets-Sheet 1
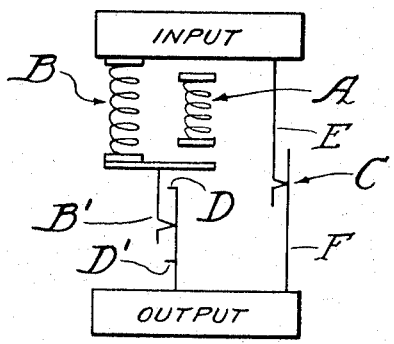
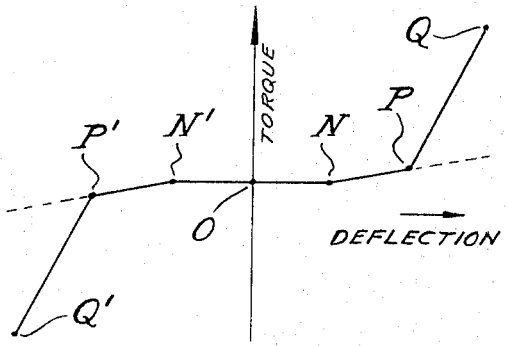
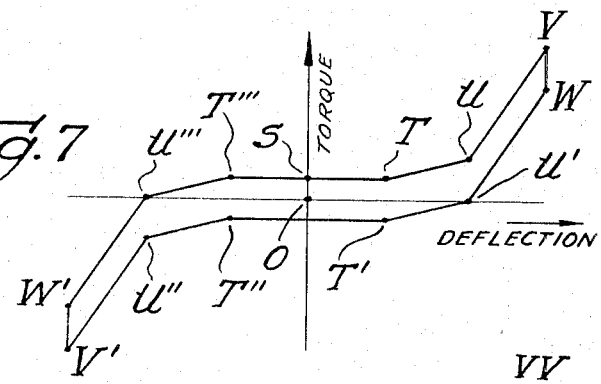
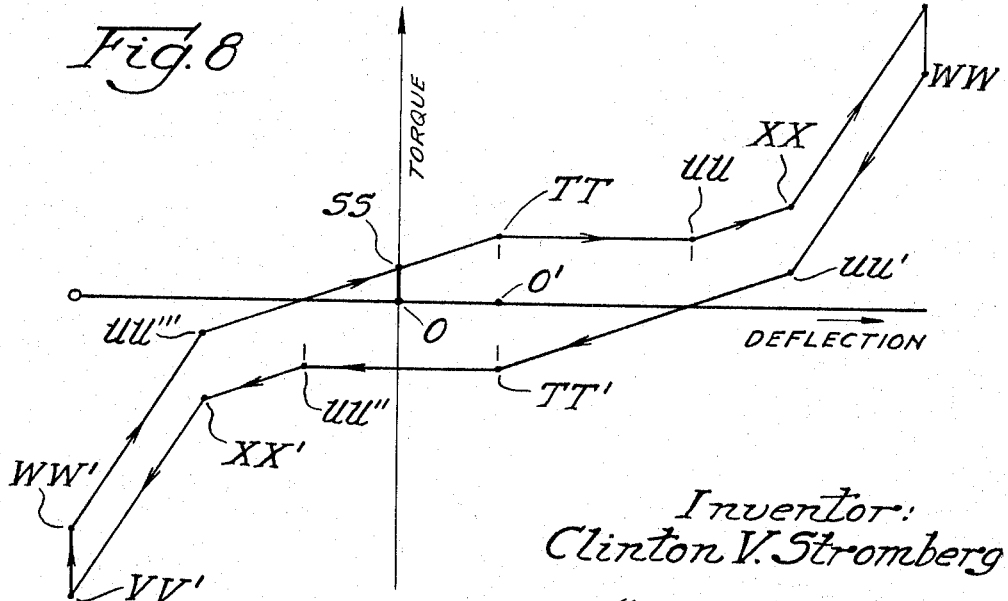
Inventor:
Clinton V. Stromberg
By: Thomas B. Hunter
Atty.

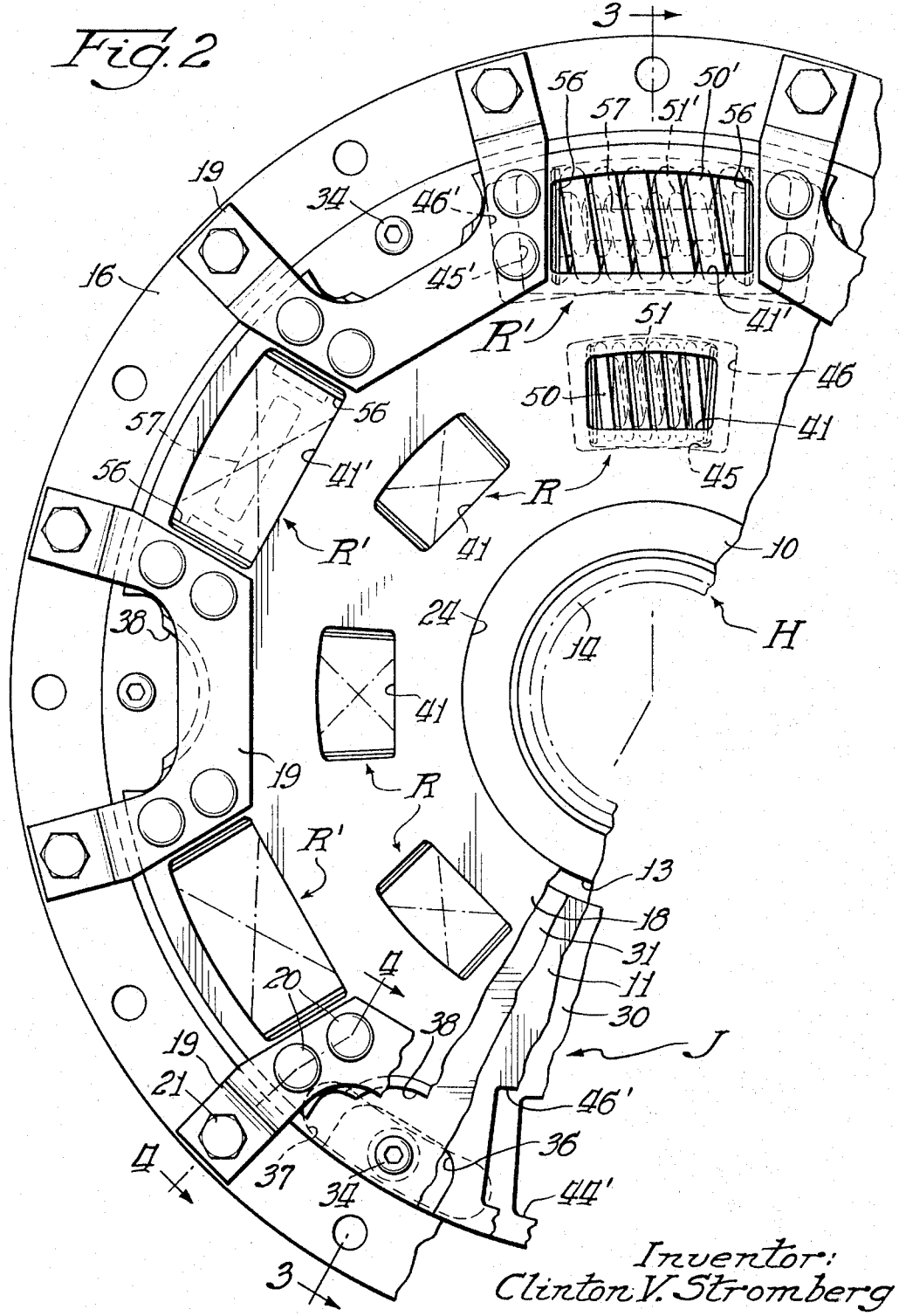

Aug. 16, 1966   C. V. STROMBERG   3,266,271
VIBRATION DAMPENER ASSEMBLY
Filed June 8, 1964   3 Sheets-Sheet 3
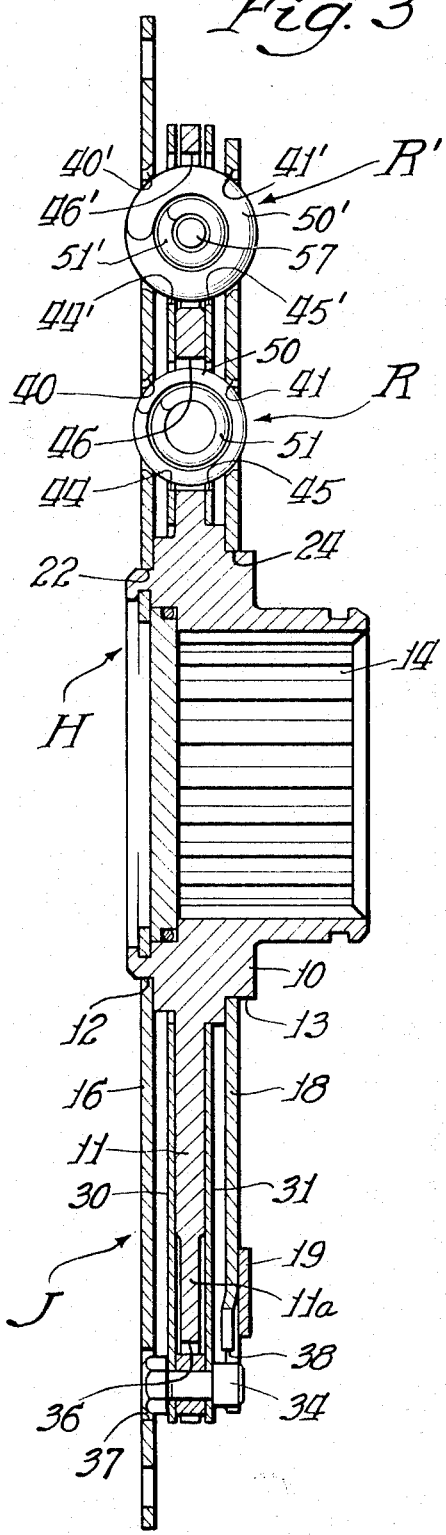
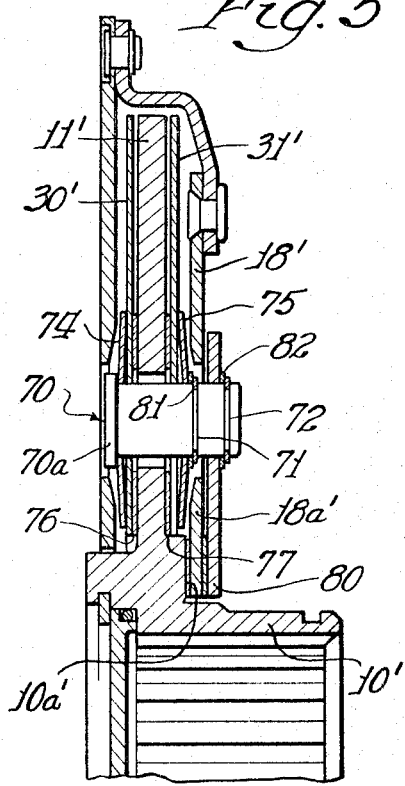
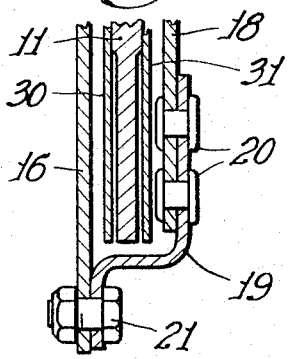
Inventor:
Clinton V. Stromberg
By: Thomas B. Hunter  Atty.

United States Patent Office 3,266,271
Patented August 16, 1966

3,266,271
VIBRATION DAMPENER ASSEMBLY
Clinton V. Stromberg, Allen Park, Mich., assignor to Borg-Warner Corporation, Chicago, Ill., a corporation of Illinois
Filed June 8, 1964, Ser. No. 373,156
10 Claims. (Cl. 64—27)

This invention relates to improvements in torsional vibration dampener assemblies and more particularly to means for isolating and damping the torsional vibrations in the driveline of a heavy duty vehicle.

In the last few years, the market for vibration dampeners in all types of power transmission systems has grown considerably. In the heavy duty field, where such equipment is, for the most part, diesel powered, it has been found that the conventional vibration dampener design does not perform satisfactorily because insufficient energy is absorbed by the damping system. It should be recognized that diesel engines and other high performance power plants are characterized by very high compression ratios. As a result, the engine excitation or forcing vibrations are of a relatively high amplitude.

This factor is of utmost importance in the design of vibration dampeners, particularly where one of the objects of the design is concerned with minimizing the effects of resonance. Resonance is said to exist when the natural frequency of a spring system coincides with the frequency of the excitation forces. In the case of the conventional vibration dampener assembly, this would be a function of the natural frequency of the spring system through which torque is transmitted from the drive to the driven member. When the system passes through resonance, it results in a substantial magnification of the input vibrations, sometimes by a factor as high as three. These high amplitude vibrations often cause severe gear noise in the transmission and may be harmful to other driveline components, such as the rear axle assembly, universal joints, and drive shaft. With proper damping, which is the technique employed to convert the mechanical vibration energy of the spring system into heat, the magnification factor may be held within tolerable limits.

One conventional technique to provide damping for the system is to provide a friction connection between the driving and driven members which acts in parallel with the spring system through which torque is transmitted from the driving to the driven member. Apparatus of this type is shown, for example, in U.S. Patent No. 2,571,291 (H. V. Reed). Such damping results in a hysteresis envelope which is a function of the damping friction, the rate of the spring system, and the maximum permissible angular deflection. It has been found, however, that simple parallel damping does not absorb sufficient energy to provide optimum performance in driveline systems of heavy duty vehicles.

Accordingly, it is an object of the present invention to provide an improved vibration dampener assembly which utilizes what may be regarded as an elastically connected or series coulomb or dry friction damping arrangement in combination with parallel coulomb damping.

It is another object of the invention to provide an improve vibration dampener in accordance with the foregoing object which will operate satisfactorily in the driveline system of heavy duty vehicles and other such equipment where the forcing or excitation vibrations are too large to be effectively damped by a conventional vibration dampener.

Additional objects and advantages will be apparent from the following detailed description taken in conjunction with the drawings wherein:

FIGURE 1 is a schematic or free-body diagram illustrating the basic concept of the spring and damping system;

FIGURE 2 is a partial plan view of a vibration dampener assembly constructed in accordance with the principles of the present invention, said view having certain portions broken away for purposes of clarity;

FIGURE 3 is a cross-sectional view taken along the plane of line 3—3 of FIGURE 2;

FIGURE 4 is a partial cross-sectional view taken along the plane of line 4—4 of FIGURE 2;

FIGURE 5 is a partial cross-sectional view illustrating an alternative embodiment of the vibration dampener assembly shown in FIGURES 2 to 4;

FIGURE 6 represents a typical torque input vs. angular deflection curve for a simple system employing two groups of sequentially engaged, double-acting springs, each having different spring rates with no dry friction or coulomb damping;

FIGURE 7 is a typical angular deflection vs. torque input curve for a vibration dampener described in connection with FIGURE 5 with parallel damping friction added; and FIGURE 8 is a typical input torque vs. angular deflection curve illustrating a hysteresis envelope for a vibration dampener assembly constructed in accordance with the principles of the present invention.

The basic principles embodied in the design of the dampener assembly of the present invention are shown in schematic form in FIGURE 1. As illustrated therein, the system includes an input member, an output member, and a first resilient means, designated generally by reference character A. Resilient means A cooperates with a second resilient means B arranged in parallel therewith. Resilient means B includes a first end portion engageable with the input member and a second end portion which is frictionally coupled to the output member at B'. This latter arrangement may be regarded as an elastically connected friction damping means. Additional coulomb damping means C are arranged in parallel with the other two elements so that acting together, they form a series-parallel arrangement which accounts for the improved performance characteristics.

It will be noted from FIGURE 1 that a lost motion connection is established between resilient means A so that relative motion between the input member and the output member is not resisted by resilient means A until after a predetermined amount of relative rotation. Limit stop means D, D' are also provided to control the extent of sliding motion after resilient means A and B are partially loaded. It should be understood that with respect to the series acting coulomb damping system, the resilient means B could be arranged to be engageable with the output member and the friction connection between B and the output member could be modified so as to have the "free" end of resilient means B frictionally connected to the input member.

Referring now to FIGURES 2 to 4, reference character H designates a rotatable hub assembly commonly arranged to function as the torque output or driven member. It should be understood that the terms "driving" and "driven," "input" and "output" are used solely to designate the direction of torque transmission at any time and do not necessarily refer to a fixed relationship. In other words, while the engine normally supplies the torque input, there are times such as when the vehicle is coasting, or when the input torque is suddenly decreased, that the engine connected side of the dampener assembly is the driven member.

The hub assembly H comprises a hub member 10 of annular form having an integral, radially extending flange 11. The hub member 10 is provided with shoulder portions 12 and 13 on opposite sides of the flange 11 and a splined bore 14 suitable for connection to the driven shaft (not shown) in a manner familiar to those skilled in the art.

The rotatable input or driving member J comprises a pair of annular plates 16 and 18 arranged one each on opposite sides of the hub flange 11 and rigidly connected together for conjoint relative rotation with respect to the hub member 10 by means of a plurality of brackets 19 (FIGURE 4) arranged around the periphery of the hub flange and radially spaced therefrom to provide a clearance. One end of the brackets 19 is connected to the side plate 18 by means of fasteners in the form of rivets 20 or other equivalent means and the other end of said brackets is bolted at 21 to side plate 16 to facilitate the assembly thereof. It will be noted that the drive plates 16 and 18 are provided with centrally located, circular openings 22 and 24 respectively which are adapted to ride on the hub member shoulder portions 12, 13. The inwardly facing surfaces of the side plates 16 and 18 in the region adjacent to the circular openings 22 and 24 are in tight frictional engagement with the annular surface immediately adjacent to the shoulders 12, 13. As explained in more detail in the following description, this would correspond to the dry friction or coulomb damping connection between the input and the output members designated at C on the schematic diagram shown in FIGURE 1.

Elastically connected or series acting coulomb damping means comprising intermediate friction members are provided in the form of annular plates 30 and 31 which are arranged on opposite sides of the hub flange 11. These plates, hereinafter referred to as the friction plates in order to distinguish them from drive plates 16, 18, are connected together for conjoint and independent rotative movement relative to both the drive plates 16, 18 and the hub member 10. The means for connecting the friction plates, in a preferred embodiment, are indicated at 34 and may comprise a plurality of circumferentially spaced bolts or fastening elements arranged around the periphery of the friction plates. Clearances for relative movement between the friction plates, the drive plates, and the hub flange are provided by recesses 36 in the latter, slots 37 in drive plate 16, and recesses 38 in drive plate 18. It should be further noted that oppositely facing surfaces on the peripheral region 11a of the hub flange are relieved to reduce the cross-sectional thickness thereof. This arrangement permits the friction plates to be clamped together against the hub flange 11 to provide tight frictional engagement between said friction plates and said hub flange at the radially innermost portion thereof.

A plurality of resilient means which may be in the form of helical or coil spring assemblies and preferably arranged in at least two distinct groups, R and R' are received within pockets or recesses provided by sets of generally registered elongated apertures or windows in the drive plates, the friction plates, and the hub flange. As shown best in FIGURE 2, group R is arranged in a circular pattern radially inwardly near the hub member while the aperture sets of group R' are concentrically located with respect thereto out at the periphery of the assembly.

For convenience, the corresponding apertures in each group will be designated with the same reference numeral but distinguished by the use of a prime (') for those associated with group R'. Reefrring first to the aperture sets of group R, the drive plates 16 and 18 are provided with elongated generally rectangular apertures 40 and 41 respectively which are of congruent dimensions. These apertures are normally registered with congruent apertures 44, 45 in the friction plates 30, 31 respectively and an aperture 46 in the hub flange 11. The apertures of each set cooperate with one another to form a plurality of recesses or pockets for the reception of the spring assemblies R. Such spring assemblies, as shown in the drawings, may include an outer coiled spring 50 and an inner, nested coil spring 51 received therein. This arrangement, whereby the two springs act in parallel, permits a great number of variations in the spring rate of such assemblies.

As shown most clearly in FIGURE 2, the length, that is, the circumferentially extending dimension, of apertures 40, 41, 44, and 45 are equal, but the aperture 46 in the hub flange is slightly larger in the circumferential and radial dimensions. The differences in the circumferential length of this group provides a lost motion connection between the drive and friction plates, moving in unison, relative to the hub flange. In other words, the drive and friction plates may move several degrees before the ends of the springs 50, 51 engage the end edges of apertures 46.

The other group of resilient means R' are received within pockets or recesses provided by other sets of registered apertures in the drive plates, the friction plates and the hub flange. The latter include congruent apertures 40', 41', in drive plates 16, 18 congruent apertures 44', 45' in friction plates 30, 31 and aperture 46' in the hub flange. The length or circumferential dimensions of the respective apertures in the drive plates, the friction plates, and the hub flange are of increasing magnitude for reasons which will be apparent from the description of this operation.

The resilient assemblies of group R' are constructed similarly to those of group R. It will be noted that each assembly comprises a pair of nested coil springs 50', 51' supported within the respective aperture pockets by means of spring retainer seats 56. A limit stop to ultimately restrain relative movement between the input and the output member after a certain predetermined amount of rotation comprises a cylindrical element 57 located within the inner spring 51'. As the springs of group R' are compressed, the spring seats eventually engage the end of the cylindrical limit stop member 57.

The aforedescribed arrangement is such that the spring assemblies of groups R and R' are engaged sequentially. In a preferred embodiment, the effective spring rate or k factor of the resilient means in group R' are preferably higher than those of group R. The additional stiffness of spring assemblies R' which are the last ones engaged in the vibration cycle, produces what has been found to be a desirable torque-deflection curve. It should be understood, however, that a great number of different arrangements can be incorporated in the present structure; by varying the spring rates, the sequence of engagement and the number of spring groups, countless modifications may be constructed.

In another embodiment of the invention, alternative means are employed to maintain the friction engagement between the friction plates and the hub flange, and between the drive plates and the hub. As shown in FIGURE 5, such means include a fastener designated generally at 70 in the form of a spool having a head portion 70a and a pair of retaining ring grooves 71, 72. The head portion 70a acts as a thrust member holding a conical spring or Belleville washer 74 which urges the side plate 30' against the hub flange 11'. The other friction plate 31' is urged into engagement against the other side of the hub flange 11' by another Belleville spring 75. Washers 76, 77 are located between the friction plates and the hub member.

A parallel friction connection is provided by means of an annular washer 80 which urged the radially innermost region 18a' of drive plate 18' into engagement with an annular surface 10a' on the hub member 10'. Belleville spring 75 is kept in place by a retaining ring 81 seated in the retaining ring groove 71 and the annular washer 80 is axially secured by means of a retaining ring 82 seated in retaining ring groove 72.

Operation

Referring now to the torque-deflection curves of FIGURES 6, 7, and 8, a brief discussion of the operation of various vibration dampener systems would be in order. The curve as shown in FIGURE 6 represents a conventional vibration dampener system of a type which includes no friction damping and wherein two sequentially engaged sets of springs having different spring rates are employed in combination with a lost motion connection between the input member and the first set of springs. In other words, some unrestrained movement between the input and output members is permitted before either set of springs are engaged. Beginning at the origin, designated by O, as torque is applied, relative rotation between the input member and the output member is effected without a measurable increase in torque input. This is due to the lost motion connection between the input member and the first set of springs. At the point designated N, the first set of springs is engaged so that the further relative angular deflection only occurs with increasing torque input. The slope of the line between N and P represents the spring rate of the first set of springs. At the point designated P, a second set of springs having a higher spring rate is engaged so that the amount of torque required to effect the same increment of angular displacement is increased. Between points P and Q, both sets of springs are being compressed until the limit of travel is reached at point Q. On the negative slope side of the vibration cycle, the points corresponding to N, P, and Q respectively, are designated N', P', and Q' which are complementary to the positive slope portion of the curve. In this system, which, as mentioned previously, has no friction damping, there is little energy absorbed. The inherent hysteresis of the springs themselves provide the only vibrational energy absorbing means.

Referring now to FIGURE 7, this curve represents a system in which two sequentially engaged sets of springs are used in combination with friction damping acting in parallel with the springs. Such a system would correspond generally to the vibration dampener assembly illustrated in the aforementioned U.S. Patent No. 2,571,291, except that such patent illustrates only a single set of springs. Beginning at the origin O, a measurable amount of torque input is required to produce relative rotative movement between the input and output members to overcome the damping friction. At point S, the damping friction is overcome and sliding movement between the input and output members occurs without measurable increase in torque input until point T is reached. At this point, the first set of springs is engaged so that further deflection is effected solely by the increase in torque input. At point U, the second set of springs is engaged, during which time additional torque input per unit of deflection is required to produce relative rotation until point V is reached at the end of the vibration cycle. Between points V and W, the damping friction is effective to hold the input and output members relative to each other until sufficient torque has been disapplied to permit relative movement. At point U', the second group of springs is fully relaxed and at point T', the first group of springs is fully relaxed. From there, the system passes through a phase which is characterized by sliding movement between the input and output members so that the displacement therebetween passes through the neutral or no-load zone to point T", at which time the first set of double-acting springs is again engaged. It should be understood that points U", V', and W' correspond respectively to points U, V, and W at the opposite end of the vibration cycle. Points U''' and T''' correspond to points U' and T'.

The curve shown in FIGURE 8 represents the hysteresis envelope for the vibration dampener constructed in accordance with the principles of the present invention. The origin designated at O represents the static center, i.e., the system at rest, and point O' indicates the center of the dynamic energy absorption diagram or hysteresis envelope. Beginning at the static center O, an increase in torque is required to overcome the friction between the drive plates and the hub member at the radially innermost portion of said drive plates. At point SS, this friction connection is overcome and the first set of springs R are compressed between the drive plates and the friction plates so that the increased torque input is represented by a positively sloping line up to point TT. Between point TT and UU, the frictional connection between the friction plates 30 and 33 and the hub flange is overcome so that relative movement between the drive plates and the hub member can occur without further compression of any of the springs. At point UU, the limit stop (corresponding to D' in FIGURE 1) is engaged so that springs R begin to compress still further. When point XX is reached, the second set of springs R' are engaged so that between points XX and VV, where the limit stop prevents further rotation, both springs of groups R and R' are being compressed.

At VV, the friction connection between the input and output members is effective to hold the input and output members in a locked relationship as torque is disapplied until the point WW is reached, at which time both groups of springs R and R' begin to be unloaded. At point UU', the springs of group R' are in a fully unloaded condition, and the first set of springs R permits relative movement, at a different rate, between the friction members and the drive plates. At point TT', the load on springs R will overcome the friction between the friction plates and the hub flange that the friction plates will begin to slide relative to the hub member until point UU". Points XX' and VV' on the negative slope portion of the curve correspond to points XX and VV, while points WW' and UU''' correspond to points WW and UU'.

In order to fully understand the operation of the vibration dampeners shown in FIGURES 2 to 5, reference will now be made to the specific details of the operation of such devices in the light of the more general discussion made above in connection with FIGURE 8. As torque is applied to the drive plates, they will tend to rotate relative to both the friction plates and the hub flange. Initially, however, friction between the drive plates and hub, as provided by the friction connection between the radially inner portion of the drive plates and the hub shoulders 12, 13, must be overcome before any relative rotation between these two members occurs. Moreover, since spring assemblies R are initially located within apertures 40 (41) of the drive plates and apertures 44 (45) of the friction plates, both of these will tend to rotate in unison relative to the hub flange. Relative rotation, however, between the friction plates and the hub flange is resisted by the frictional connection between the sides of the friction plates 30, 31 and the sides of the annular flange 11. Consequently, the spring assemblies R will begin to compress while the drive plates are rotated relative to the friction plates and the flange; the friction plates and the hub flange, during this phase, are temporarily locked as a result of the tight frictional engagement therebetween. Spring assemblies R continue to be compressed until the load on the springs has increased to a sufficient value to overcome the frictional connection between the friction plates and the hub flange. At this time, the drive plates and the friction plates will move in unison relative to the flange with no further increase in torque applied and no further compression of springs R.

After a predetermined amount of sliding movement, which depends on the relative length of the apertures in the hub flange and drive plates, the ends of springs R engage the end portions of the apertures 46 in the hub flange. These springs will then begin to be compressed again between the end portions of the drive plate aperture and the oppositely facing end portions of the hub flange aperture. As relative rotation continues, the spring seats supporting spring assemblies R′ will engage the end portions of apertures in the hub flange. When this occurs, the force causing angular displacement between the input and output shafts is now opposed by the additional springs of group R′ which act in parallel with those of group R. This is what accounts for the increased slope of the torque-deflection curve (FIGURE 8) between XX and VV.

At the end of the positive phase of the vibration cycle, which corresponds to point VV in FIGURE 8, the spring assemblies of both groups R and R′ are fully compressed and the maximum relative angular displacement between the hub member and the drive plates is in effect. As negative rotation or relative movement between the hub member and the drive plates in the opposite direction begins, the frictional connection between the friction plates 30, 31 and the hub member is effective to hold these two elements in locked relationship as torque is disapplied. At the point corresponding to WW on FIGURE 8, the spring assemblies of groups R and R′ begin to unload as relative movement between the drive plates 16, 18 and the friction plates 30, 31, moving in unison, begin to counter-rotate with respect to the hub member 11. At the point corresponding to UU′ in FIGURE 8, the spring assemblies of group R′ are fully unloaded and relative movement between the drive plates 16, 18 and the friction plate hub member combination is by the second set of spring assemblies R. During this phase, the friction plates 30, 30′ and the hub member are still locked together but the drive plates are moving relative to the friction plate with springs R being continually unloaded between the edges 44 (45) in the friction plates and the edges 40 (41) in the drive plates. The spring assemblies of group R will eventually pass through an unloaded condition and such springs will begin to be compressed again between opposite edges of the apertures 40 (41) and apertures 44 (45). When the load on springs R is sufficient to overcome the frictional connection between the hub member and the friction plates, these two elements will begin to slide relative to one another without further compression of spring assemblies R. This corresponds to the increment between points UU″ and TT′ on FIGURE 8. After a predetermined amount of relative rotation, the spring assemblies of group R′ are again engaged to effect a radical change in the slope of the line between VV′ and UU′ until the limit stop means 54 is engaged. The remainder of the vibration cycle corresponds to the relationship between the elements just described only in reverse order. It should be understood that a truly frictionless system is impossible to build, and many prior art devices will have some nominal amount of friction between the various elements. Consequently, as used in this description, the terms "frictional connection," "means for establishing frictional connection," and similar terms denote a positive arrangement for achieving such a relationship.

While this invention has been described in connection with certain specific embodiments thereof, it is to be understood that this is by way of illustration and not by way of limitation; and the scope of this invention is defined solely by the appended claims which should be construed as broadly as the prior art will permit.

What is claimed is:

1. In a torsional vibration dampener, a rotatable torque input member; a rotatable torque output member; an intermediate member frictionally engaged with one of said members; first resilient means interposed between said input member and said friction member; second resilient means interposed between said input member and said output member, said first and second resilient means and said friction member providing a first path for torque transmitted from said input member to said output member; and means for establishing a second path for the transfer of torque between said input member and said output member which is parallel to said first path.

2. In a torsional vibration dampener, a first rotatable member; a second rotatable member frictionally engaged with said first rotatable member; a third rotatable member frictionally engaged with said second rotatable member; and resilient means operatively associated with said first, second and third rotatable members to provide a torque transfer path therethrough from said first rotatable member to said second rotatable member, whereby as said first member is rotated relative to said second member, the friction between said second and third members prevents relative movement between said second and third members until the load on said resilient means exceeds the friction between said second and third members.

3. Apparatus as defined in claim 2 wherein said resilient means is enagageable with said second rotatable member after a predetermined amount of relative rotation therebetween.

4. Apparatus as defined in claim 2 including additional resilient means arranged to provide a second path for torque transfer in parallel with said first path, said additional resilient means being engaged between said first and second members after a predetermined amount of relative rotation between said first and second members.

5. A torsional vibration dampener assembly comprising a rotary driven member; a rotary drive member; resilient means interposed between said drive member and said driven member to resist relative rotation therebetween whereby torque is transmitted from said driving member to said driven member through said resilient means; means establishing a friction connection between said drive member and said driven member; a friction member; resilient means establishing an elastic connection between said friction member and one of said drive or driven members; and means establishing a friction connection between said friction member and one other of said drive or driven members.

6. A torsional vibration dampener assembly comprising a rotary torque input member; a rotary torque output member; an intermediate member mounted for relative rotation with respect to both said input member and said output member; first resilient means interposed between and engaged by said input member and said intermediate member; second resilient means arranged for interpositional engagement between said input member and said output member, said first and second resilient means being arranged for sequential engagement; means establishing a frictional connection between said intermediate member and said rotary output member; and means establishing a frictional connection between said rotary input member and said rotary output member.

7. In a torsional vibration dampener, a rotatable drive member; a rotatable driven member in frictional engagement with said drive member; an intermediate member independently rotatable with respect to said drive and driven members, said intermediate member being in frictional engagement with said driven member; aperture means in each of said members providing at least one elongated pocket, said aperture means having opposed edges; resilient means received in said pocket having terminal portions adapted to engage the edges of each of said aperture means whereby as said drive member is rotated relative to said driven member the frictional force between said intermediate member and said driven member is effective to hold said intermediate member until the opposing force on said resilient means is greater than said frictional force, after which said drive member and said intermediate member move conjointly relative to said driven member until one end of said resilient means is brought into engagement with the end of the aperture means in said driven member.

8. Apparatus as defined in claim 7 including additional aperture means in said members, said aperture means cooperating to provide at least one additional elongated pocket, and additional resilient means received in said additional pocket having end portions initially seated against the ends of said additional aperture means in said drive member, said additional resilient means being sequentially engageable with the end portions of the additional aperture means in said intermediate member and said driven member respectively.

9. In a torsional vibration dampener, a driven member having a radially extending flange; a pair of annular friction plates arranged on opposite sides of said flange, at least one of said friction plates having a portion in frictional engagement with said driven member; a pair of annular drive plates arranged on opposite sides of said friction plates, at least one of said drive plates being frictionally engaged with said driven member; means defining a plurality of apertures in said flange, said friction plates, and said drive plates, said apertures cooperating to define a plurality of pockets; and springs received within each said pocket said springs having end portions engaging opposite edges of the apertures in said hub flange, said apertures in the friction plates being larger than the apertures in said hub flange, said apertures in said drive plates being larger than the apertures in said friction plates, whereby as torque is applied to said drive plates the friction between said friction plates and said hub flange prevents relative movement therebetween until the load on said springs equals said friction force, and as further relative movement between the drive plates and the flange is effected, the springs are compressed between the edges of the aperture in the drive plates and the flange respectively.

10. In a torsional vibration dampener, a rotary driven member including a hub having a radially extending flange, said flange being provided with a plurality of openings; a rotary drive member including a pair of spaced plate members located on opposite sides of said flange, said plate members being connected together and arranged for relative rotation with respect to said flange, said plate members having a plurality of openings in general registry with said flange openings to define a plurality of pockets; resilient means received in each of said pockets and arranged to yieldably resist relative rotation between said rotary members, the improvement comprising means establishing a friction damping connection between said drive member and said driven member; a friction member arranged for independent relative rotary movement with respect to said driven member and said drive member; resilient means establishing an elastic connection between said friction member and one of said rotary members; and means establishing a frictional connection between said friction member and the other of said rotary members.

References Cited by the Examiner

UNITED STATES PATENTS

| | | | |
|---|---|---|---|
| 2,364,988 | 12/1944 | McFarland | 64—27 |
| 2,571,291 | 10/1951 | Reeb | 64—27 |
| 2,984,091 | 5/1961 | Ludwig | 64—27 |
| 3,091,949 | 6/1963 | Sink | 64—27 |
| 3,101,600 | 8/1963 | Stromberg | 64—27 |

MILTON KAUFMAN, *Primary Examiner.*

HALL C. COE, *Examiner.*